May 18, 1954 — R. W. KREBS — 2,678,952
PROCESS FOR REDUCING SULFUR CONTENT OF OXO ALCOHOLS
Filed March 31, 1951
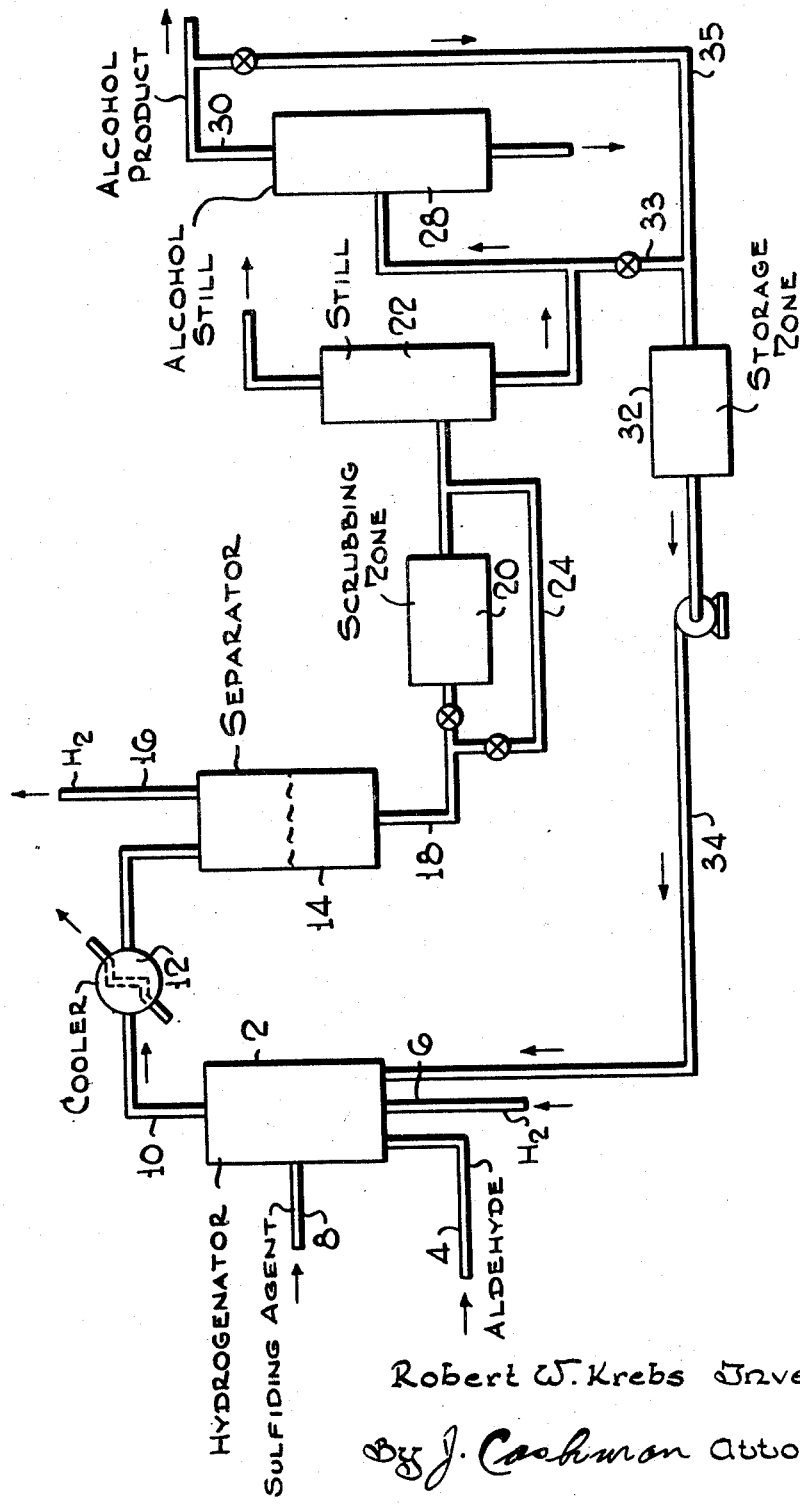
Robert W. Krebs Inventor
By J. Cushman Attorney Patented May 18, 1954

2,678,952

UNITED STATES PATENT OFFICE 2,678,952

PROCESS FOR REDUCING SULFUR CONTENT OF OXO ALCOHOLS

Robert W. Krebs, Baton Rouge, La., assignor to Standard Oil Development Company, a corporation of Delaware Application March 31, 1951, Serial No. 218,589

12 Claims. (Cl. 260—638)

The present invention relates to the preparation of oxygenated organic compounds by the reaction of carbon monoxide and hydrogen with carbon compounds containing olefinic linkages in the presence of carbonylation catalysts. More specifically, the present invention relates to the purification of alcohol products obtained by the hydrogenation of the aldehyde products derived from this process in the presence of a sulfur-insensitive hydrogenation catalyst.

The synthesis of oxygenated organic compounds from olefinic compounds and mixtures of CO and $H_2$ in the presence of a catalyst containing metals of the iron group, such as cobalt or iron, preferably the former, is well known in the art. In the first stage, the olefinic material, catalyst and the proper proportions of CO and $H_2$ are reacted to give a product consisting essentially of aldehydes containing one more carbon atom than the reacted olefin. This oxygenated organic mixture, which contains dissolved in it salts and the carbonyls and molecular complexes of the metal catalysts, is treated in a second stage to cause removal of soluble metal compounds, such as carbonyls, from the aldehyde product in a catalyst removal zone. The catalyst-free material is then generally hydrogenated to the corresponding alcohol, and it is to this stage that the present invention applies.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type of alcohols desired. Not only olefins, but most organic compounds possessing at least one non-aromatic carbon-carbon double bond may be reacted by this method. Thus straight and branch chained olefins and diolefins, propylene, butylene, pentene, butadiene and pentadiene, styrene, olefin polymers such as di-isobutylene, polypropylene fractions, olefinic fractions from thermal or catalytic cracking operations, and other sources of organic compounds, both hydrocarbons and oxygenated hydrocarbons, containing olefinic linkages, may be used as starting material.

The catalyst in the first stage may be added as salts of the catalytically active metal with high molecular weight fatty acids, such as oleic, stearic, or naphthenic, or it may be added as a slurry of the metal or its compounds, or as the carbonyl. Inasmuch as the active catalyst is probably the hydrocarbonyl of the metal, such as cobalt hydrocarbonyl, most forms of the metal may be employed as the catalyst, and these are converted into the active species in the course of the reaction.

The synthesis gas mixture fed to the first stage may consist of any ratio of $H_2$ to CO, preferably the gases are present in about equal volumes. The conditions for reacting $H_2$ and CO vary somewhat in accordance with the nature of the olefin feed, or the catalyst form, but the reaction is generally conducted at pressures in the range of about 1500 to 4500 p. s. i. g. and at temperatures in the range of about 250°–450° F. The ratio of synthesis gas to olefin feed may vary widely; in general, about 2500 to 15,000 cubic feet of $H_2$+CO per barrel of olefin feed are employed.

Following the carbonylation stage, the aldehyde product, containing in solution, a considerable amount of dissolved catalyst in the form of carbonyl and other compounds and complexes, is generally treated at elevated temperatures in the presence either of a stripping gas or steam to decompose the carbonyl to an insoluble form of the metal, and drive off CO formed. Thereafter, the aldehyde product is freed of suspended catalyst metal or compounds, and is passed to a hydrogenation zone for conversion into alcohols.

The hydrogenation stage may be operated at conventional hydrogenation conditions including temperatures and pressures and liquid feed rates of the same order of magnitude as those obtaining in the first, or carbonylation, stage. Various known types of catalysts such as nickel, tungsten, molybdenum and their oxides or sulfides, supported or unsupported, may be used.

The overall carbonylation, or so-called "Oxo" reaction, as outlined above, provides a particularly effective method for preparing valuable primary alcohols for use as intermediates in the production of esters suitable for plasticizers, by reaction with acids, such as the di-basic acids, for example, phthalic acid or anhydride, and maleic acid. Certain of the synthetic alcohols prepared by the carbonylation and hydrogenation reaction, particularly the $C_8$ and $C_9$ alcohols, are especially preferred for use in forming esters to be used as plasticizers in light-colored or colorless resins and clear plastics.

Serious difficulties have been encountered in the hydrogenation stage as a result of sulfur poisoning of the hydrogenation catalyst, when the sulfur-sensitive catalysts such as nickel and the like, are employed. The most readily available olefinic feed stocks for the carbonylation reaction are selected hydrocarbon streams derived from petroleum refinery sources, and these frequently have sulfur contents of 0.1% and even higher. Furthermore, there are a variety of other ways in which sulfur may be introduced into the final alcohol product during both the carbonylation and the hydrogenation stages. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and even completely destroy catalyst activity unless sulfur-insensitive catalysts are used. The sulfur-sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur-insensitive catalysts includes particularly certain metallic sulfide hydrogenating catalysts, examples of such catalysts being nickel sulfide, molybdenum sulfide, and tungsten sulfide. While these catalysts have the decided advantage of avoiding the inactivation due to sulfur content of the feed stock, they also possess the disadvantage that they permit the sulfur to pass unchanged through the hydrogenation zone and, indeed, when freshly sulfided, tend to introduce additional sulfur contamination into the alcohol. Thus, the final crude alcohol may have a total sulfur content from 30 to 100 p. p. m. or in some cases, an even higher value if no sulfur clean-up operations are done.

In general, the entire content of the sulfur which is present in the synthetic Oxo alcohols is in the form of organically combined sulfur. Although the exact type of organic impurities in which the sulfur occurs has not been fully determined, it is believed that the sulfur is present in a variety of forms and that in general, it is deleterious in all these forms when occurring in the final alcohol, although certain types of organically combined sulfur are definitely known to be more undesirable than are other sulfur impurities. The more highly alkylated and less acidic sulfur materials appear to be less active in producing colored impurities in stainless steel and other types of metallic equipment. Furthermore, it has been found that in general the sulfur present in which the valence of the sulfur indicates it to be in a more highly oxidized form is less injurious than the sulfur which is present in a relatively reduced valence state. The finished alcohol should contain a minimum of sulfur-containing compounds and particularly those in which the sulfur is relatively more acidic and in a relatively more reduced state. It is also a better practice to remove a major portion of the carbonyl compounds in order to obtain alcohols which give commercially acceptable ester plasticizers. Some such purification has been considered necessary if the ester is manufactured in stainless steel equipment and unreacted or excess alcohol is recycled to the esterification zone. A number of types of sulfur-containing impurities are believed to be present and among these probable in an iso-octyl alcohol product prepared from a $C_7$ olefin, are iso-octyl mercaptan, iso-octyl sulfide, diethyl sulfide, diethyl disulfide, di-isopropyl sulfide, di-isopropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials including sulfur-containing impurities have the opportunity to build up during the recycle stages to a point at which they must be purged from the system before continuing the recycling operation. This presents impurity problems which occur even though the actual reaction is carried out in corrosion-resistant or glass-lined equipment. The high temperature esterification is a much more severe test as to the purity and stability of the reactants and is more truly representative of typical plant scale esterification conditions.

It has, in the past, been a difficult and expensive process to remove the undesirable products present in the carbonylation alcohol, either directly from the latter, or from the feed streams to the carbonylation process. Thus, for example, in the production of iso-octyl alcohol by reacting a heptene fraction with CO and $H_2$, it has been customary to recover the alcohol by caustic washing the crude hydrogenated product to remove acidic constituents, followed by distillation to remove unreacted feed stock as well as the by-products of the reaction. As discussed previously, the finished product, to be satisfactory for many desired uses, must have an extremely low sulfur, carbonyl and olefin content, and when the tolerances for these has been exceeded, it has been difficult to improve the product quality economically. Re-distillation has usually proved inadequate as have steps such as severe caustic washing, mild oxidation, treatment with metal salt solutions, and other palliatives. The most effective measures in the past, have been careful selection or processing of feed stocks for low sulfur content, and the use of a second hydrogenation or hydrodesulfurization step, employing a very active but readily poisoned catalyst such as nickel. Aside from the added investment and operating costs involved, these measures may severely limit the availability of suitable feed stocks for the process.

A further problem arises when the alcohols are produced over a sulfur-resistant catalyst, such as molybdenum or tungsten sulfide. As pointed out previously, these catalysts have the great advantage of long life, physical strength and resistance against poisoning by carbon monoxide and sulfides. However, they require generally somewhat more elevated temperatures than the sulfur sensitive catalysts, such as nickel. At these elevated temperatures, about 400°–550° F., there has been observed the tendency, especially with freshly prepared catalyst, for sulfur to be lost from the catalyst and appear in the alcohol stream. The amounts are relatively small, and relatively difficult to detect and, in most operations, would not raise difficulties. But in the case where alcohols are prepared for utilization as plasticizer intermediates, these small amounts of sulfur play an important role in degrading the product and making it unfit for use as a plasticizer. Thus, there results an economic loss, either in a sizable production of low-grade product, or loss in production while the catalyst is being conditioned on other feed stocks, or investment in special treating equipment or hydrodesulfurization facilities to be used only part time. Thus, in a 100 B./D. plant operation, manufacturing octyl alcohol from $C_7$ olefin and passing the intermediate aldehyde product over freshly prepared molybdenum sulfide catalyst supported on activated carbon, the first 14,000 gallons of alcohol produced analyzed for about 12 parts per million of sulfur and produced on esterification a $KA_2$ ester color of 0.35. Even with this small amount of sulfur, the alcohol was unsuitable for use as a plasticizer intermediate for later esterification with phthalic anhydride. The ester color is a measure of optical density of the phthalate ester as produced under prescribed conditions, and is affected by the presence of extremely small amounts of sulfur impurities.

The surprising result has now been found that, though initially the sulfactive catalyst donates and liberates sulfur to the alcohol stream, the same catalyst after it has come more or less into equilibrium with the process stream, removes sulfur from the alcohol product. In accordance with the present invention, therefore, at least a portion of the crude or distilled alcohol as recovered from the crude in semi-finished or finished condition, is recycled to the hydrogenation zone in which crude alcohol is being processed. This recycling, of course, is not carried out until the sulfur content of the stream from the hydrogenator has been decreased to a value consonant with forming a good ester product, usually no more than about 5 to 10 parts per million. It might have been expected that there would be no net improvement from such a recycle step, where fresh aldehyde and off-test alcohol are jointly subjected to the hydrogenation reaction in the presence of a sulfactive catalyst, either because the recycled material would not be further acted upon, or because its presence would prevent the fresh crude alcohol from attaining the quality level which would otherwise be reached. Nonetheless, the partially spent catalyst thus gave an improved product over that obtained by using fresh catalyst.

The present invention and its application will best be understood from the more detailed description hereinafter, wherein reference will be had to the accompanying drawing, which is a schematic representation of a system suitable for carrying out a preferred embodiment of the invention. As the latter resides in the hydrogenation rather than in the carbonylation stage, the carbonylation stage and the step of freeing the aldehyde product from dissolved catalyst are, for the sake of brevity, not shown.

Referring now to the drawing, liquid aldehyde product substantially free of dissolved and suspended cobalt, and which may contain in solution as much as 0.0050% sulfur is passed to the lower portion of hydrogenator 2 via line 4. Simultaneously, hydrogen is supplied to reactor 2 through line 6 in proportions sufficient to convert the aldehyde product into the corresponding alcohols. The catalyst within reactor 2 is preferably a sulfactive one, and an excellent catalyst is one comprising molybdenum sulfide supported on an activated carbon carrier. Hydrogenator 2 may be operated at pressures of from about 2500–4500 p. s. i. g. and at temperatures of from about 400° to 550° F., a liquid feed rate of about 0.25 to 2 v./v./hr., and a hydrogen feed rate of from about 5,000–20,000 normal cubic feet per barrel of feed. It is also beneficial to add to the hydrogenation zone, up to 8–10% of water to aid in selectivity to alcohol product.

When the hydrogenation catalyst is freshly prepared or is reactivated, it may be first added in the form of molybdenum oxide or ammonium molybdate carried on or impregnating an activated char, such as coconut char. The impregnated charcoal may be dried, heated to about 200°–400° F., and sulfided with a suitable sulfiding agent, such as hydrogen sulfide, carbon disulfide, and the like. These sulfiding agents may be admitted through line 8. The catalyst in form for use, consists of about 10% molybdenum sulfide on charcoal.

After sulfiding, the catalyst is allowed to come to conditions, the excess sulfiding agent is purged, and preferably a stream of inert hydrocarbon, such as Varsol, is passed through the bed for a period of several hours. Thereafter, the aldehyde feed is cut in under operating conditions described above.

The products of the hydrogenation reaction are withdrawn overhead through line 10, when through cooler 12 into high pressure separator 14, where unreacted hydrogen may be withdrawn overhead through line 16 for further use in the system. Liquid products are withdrawn from separator 14 through line 18 and may be passed, if desired, to a caustic scrubbing zone 20, where the alcohol product, particularly if its sulfur or acid content is high, may be treated with a dilute caustic or carbonate solution, say 5 to 10%. As pointed out, the alcohol resulting from reduction of aldehyde with freshly sulfided catalyst has a comparatively high sulfur content, of the order of 10 to 30 p. p. m. This caustic scrubbing treatment may, however, be dispensed with and the crude alcohol fed directly into still 22 through line 24. In still 22 the low boilers, mostly hydrocarbons boiling below the desired alcohol product are distilled overhead. Thus, when a $C_7$ olefin fraction is the feed to the carbonylation reactor, generally the product boiling up to about 340° F. is removed as a heads cut in still 22, and may be used as a gasoline blending agent. The bottoms from this primary distillation are withdrawn through line 26 to alcohol still 28, where product alcohol is removed overhead through line 30, by distillation at atmospheric or reduced pressures. The bottoms from this distillation may be further processed, or used as fuel.

The recovered alcohol, as has been pointed out, may still contain excessive quantities of sulfur, resulting from either incomplete desulfurization during hydrogenation or from picking up sulfur in said zone. The alcohol product, off-test, is passed to storage zone 32 and is allowed to accumulate until the sulfur content of the effluent from 28 reaches a satisfactory value, below about 10 p. p. m. At a throughput rate of 0.2 to 1.0 v./v./hr. aldehyde through the hydrogenator, this may take about 2 to 6 days; in one particular run, 14,000 gallons were thus segregated. When the sulfur content of line 35 becomes satisfactory, off-test alcohol product is pumped from storage 32 via line 34 back to hydrogenator 2, and the mixture of aldehyde and off-test alcohol is subjected to hydrogenation.

Any desired blend of alcohol and aldehyde may thus be hydrogenated together to produce an alcohol product of satisfactory low sulfur content; it is preferred to use such blends as to produce about equal parts of fresh and recycled alcohols.

This recycling operation may be used to advantage in several ways. It is an economical method of upgrading off-specification alcohol produced in the early stages of operation of fresh catalyst, or resulting at anytime from upset operating conditions. In such cases it avoids marketing reduced-quality grades of product and eliminates the investment in stand-by equipment for upgrading occasional off-specification product. It can also be used to obtain satisfactory product from some olefin feed stocks too high in sulfur content to be acceptable for ordinary once-through operation to a given product specification. This affords an important economic advantage in widening the choice or increasing the quantity of available feed stocks, or in producing a superior quality of alcohol from existing feeds.

The proportion of alcohol to be recycled depends on the concentration of sulfur impurities which result from the particular feed stock or operating conditions employed.

The process of the present invention and its results may be further illustrated by the following specific example obtained in a pilot plant producing octyl alcohols from C7 olefins at a nominal feed rate of 100 B./D. A segregated batch of off-grade alcohol product, amounting to about 14,000 gallons, was blended with the current production at a time that a satisfactory alcohol was being produced. As the fresh aldehyde feed to the hydrogenation stage gave about 58% alcohol by volume, a recycle ratio of about 58 volumes of off-test alcohol per 100 volumes of fresh crude aldehyde feed was employed, or about 50% of the total alcohol recovery rate. The resulting crude hydrogenated product was distilled and yielded an alcohol of a quality essentially equivalent to that which had been obtained from the fresh current production alone under approximately the same operating conditions, and considerably better than that calculated for a blend of the corresponding finished alcohols, assuming no sulfur removal from the off-test product.

| Alcohol | Feed Rate, B./D. | Temp., °F. | Sulfur, p. p. m. | Ester Color |
|---|---|---|---|---|
| Specification | | | 15 Max. | 0.15 Max. |
| Off-test | | | 18 | 0.35 |
| Current Production: | | | | |
| Period A | 275 | 508 | 9 | 0.12 |
| Period B | 237 | 525 | 7 | 0.11 |
| Calculated Blend (1:1) | | | 13 | 0.23 |
| Hydrogenated Blend (1:1) | 210 | 522 | 6 | 0.12 |

Thus it can be seen that by including 50 parts of high sulfur alcohol with 50 parts of normal aldehyde feed (as alcohol) the resulting alcohol was upgraded to good quality with no deterioration or sacrifice in the quality of the remainder.

Other modifications apparent to those skilled in the art are within the scope of the invention. Thus, it may be desirable to recycle semi-finished alcohol directly to the hydro-stage through lines 33 and 34 after the light ends have been removed rather than distilling overhead the finished alcohol and recycling that product through lines 35 and 34.

What is claimed is:

1. In a carbonylation process wherein olefins, carbon monoxide and hydrogen are contacted in an initial carbonylation zone with a cobalt carbonylation catalyst under conditions of elevated temperatures and pressures to produce an aldehyde comprising reaction product, and said aldehyde product is further subjected to a hydrogenation reaction in a hydrogenation zone in the presence of a sulfactive hydrogenation catalyst to produce an impure sulfur contaminated alcohol product, the improvement of upgrading the off-specification alcohol which comprises segregating said alcohol product, continuing the passage of said aldehyde product to said hydrogenation zone until the sulfur content of the hydrogenator effluent reaches a predetermined low value, said value being lower than the sulfur content of said segregated alcohol product, thereafter recycling at least a portion of said segregated alcohol product to said hydrogenation zone, admixing said material with aldehyde product, and recovering an alcohol product containing no more sulfur than said predetermined value.

2. The process of claim 1 wherein said hydrogenation catalyst is freshly sulfided sulfactive hydrogenation catalyst.

3. The process of claim 2 wherein said freshly sulfided catalyst is molybdenum sulfide supported on activated carbon.

4. The process of claim 1 wherein said alcohol product is octyl alcohol.

5. The process of claim 1 wherein hydrogenation conditions include temperatures of about 400°–500° F. and pressures of about 2500–4500 p. s. i. g.

6. The process of claim 1 wherein said high sulfur-containing alcohol product is distilled prior to said segregation and recycle.

7. The process of claim 1 wherein said high sulfur-containing alcohol product comprising hydrogenator effluent is recycled without prior distillation of alcohol.

8. The process of claim 1 wherein the proportion of recycle alcohol to aldehyde feed to said hydrogenation zone is adjusted to provide equal volumes of recycle and fresh alcohol product in the resulting hydrogenator effluent.

9. In a carbonylation process wherein olefins, carbon monoxide and hydrogen are contacted in an initial carbonylation zone with a cobalt carbonylation catalyst under conditions of elevated temperatures and pressure to produce an aldehyde-comprising reaction product and said aldehyde comprising reaction product is further subjected to a hydrogenation reaction in a hydrogenation zone in the presence of a sulfactive hydrogenation catalyst to produce an impure sulfur-contaminated crude alcohol product, the improvement which comprises passing said crude alcohol product to a distillation zone, removing overhead contaminants boiling below the boiling range of the desired alcohol product, segregating product comprising the desired alcohol, continuing the passage of said aldehyde product to said hydrogenation zone until the sulfur content of the hydrogenator effluent reaches a predetermined low value, said value being lower than the sulfur content of said segregated alcohol product, thereafter recycling at least a portion of said segregated product to said hydrogenation zone and mixing said material with aldehyde product and recovering an alcohol product containing no more sulfur than said predetermined value.

10. The process of claim 9 wherein the total product after the separation and removal of said low boiling constituents is segregated and then recycled to said hydrogenation zone.

11. The process of claim 9 wherein the total product after said low boiling constitutents are removed is further fractionated, the fraction boiling within the desired alcohol boiling range is segregated and said segregated alcohol product contaminated with sulfur impurities is recycled to said hydrogenation zone.

12. In a carbonylation process wherein olefins, carbon monoxide and hydrogen are contacted in an initial carbonylation zone with a cobalt carbonylation catalyst under conditions of elevated temperatures and pressures to produce an aldehyde comprising reaction product, and said aldehyde product is further subjected to a hydrogenation reaction in a hydrogenation zone in the presence of a sulf-active hydrogenation catalyst to produce an impure sulfur-contaminated alcohol product, the improvement of upgrading the off-specification alcohol which comprises segregating said alcohol product, continuing the passage of said aldehyde product to said hydrogenation zone until the sulfur content of the finished alcohol product reaches a value no higher than about 15 parts per million, thereafter recycling at least a portion of said segregated alcohol product to said hydrogenation zone, admixing said material with aldehyde product, and recovering a finished alcohol product containing not more than about 15 parts per million of sulfur.

References Cited in the file of this patent

UNITED STATES PATENTS

| Number | Name | Date |
|---|---|---|
| 2,509,878 | Owen | May 30, 1950 |
| 2,525,354 | Hoog et al. | Oct. 10, 1950 |
| 2,530,989 | Parker | Nov. 21, 1950 |
| 2,544,271 | Liedholm et al. | Mar. 6, 1951 |
| 2,585,816 | Mertzweiller | Feb. 12, 1952 |
| 2,595,763 | Carlson | May 6, 1952 |
| 2,614,128 | Mertzweiller | Oct. 14, 1952 |